United States Patent [19]

Rosenberg

[11] 4,056,094
[45] Nov. 1, 1977

[54] SOLAR HEAT COLLECTOR

[75] Inventor: Paul Rosenberg, Larchmont, N.Y.

[73] Assignee: The Center for the Environment & Man, Hartford, Conn.

[21] Appl. No.: 660,437

[22] Filed: Feb. 23, 1976

[51] Int. Cl.² .............................................. F24J 3/02
[52] U.S. Cl. .................... 126/271; 237/1 A; 165/171
[58] Field of Search ............... 126/270, 271; 237/1 A; 165/171; 357/74

[56] References Cited

U.S. PATENT DOCUMENTS

2,783,682   3/1957   Swenson .......................... 126/271
3,200,820   8/1965   Garrett ............................ 126/271

Primary Examiner—Kenneth W. Sprague
Assistant Examiner—James C. Yeung
Attorney, Agent, or Firm—Alfred H. Rosen; Frank A. Steinhilper

[57] ABSTRACT

A solar heat collector designed to obtain maximum heat from sunlight rays when operational and minimum heat from sunlight rays when non-operational. The solar heat collector contains two sheets of solid material spaced and confronting each other between which a heat transfer liquid flows through baffle arrangement so as to increase the efficiency for obtaining higher temperatures of the heat transfer liquid.

13 Claims, 13 Drawing Figures

SOLAR HEAT COLLECTOR

BACKGROUND OF THE INVENTION

The advent of the energy crisis throughout the world has spurred interest in obtaining alternatives to today's sources of energy. The price of fossil fuel has risen to such a level as to make previous price forbidden alternatives economically competitive. Such an alternative is solar energy. The major obstacle encountered by the prior art in the fields of solar heating and cooling and the provision of domestic hot water was economic, resulting from the high cost of the equipment needed to collect and store solar energy. In addition, there are basic problems inherent in the nature of solar radiation. Solar radiation is relatively low in intensity, rarely exceeding 300 Btu/ft$^2$/hr; it is intermittent because the daily variation in direct solar intensity from zero at sunrise to a maximum at noon and back to zero at sunset is inevitable; and it is subject to unpredictable interruptions due to variable weather patterns.

In order to trap the energy from solar radiation a device called a collector is used. This device simplistically contains a gaining surface, a losing surface and means to bring a heat transfer liquid to flow adjacent to the gaining surface. The gaining surface, known as the absorber, is conventionally a black surface upon which solar radiation is converted to heat, and the surface above the black absorber usually parallel thereto, is the losing surface since heat is lost to the outside environment through this surface. Conventionally, the black absorber is also the losing surface since collected heat is lost to the outer portions of the assembly through this surface.

The major objective of solar heat collectors has been to collect as much solar radiation as possible, at the highest attainable temperature for the lowest possible investment in labor and materials. To determine the efficiency of a collector, an efficiency calculation is performed in energy terms. The efficiency of a collector can be described as the heat energy added to the liquid during its passage through the collector, divided by the energy of the impinging sunlight during the time of passage of the fluid. A comparison between the present invention and the prior art reveals a relatively small increase in the absolute value of the efficiency at a particular operating temperature. However, a comparison of the relative efficiencies calculates to be a significant efficiency increase over the prior art. For example at a particular operating temperature, the prior art efficiency is 20% while the present invention efficiency exceeds 24%. This represents an approximately 20% overall increase in efficiency over the prior art.

Up to now, solar heat collectors have suffered from efficiency ratings so low that they require large absorber surfaces areas to function effectively. The present invention, described below, can collect the same amount of heat as conventional collectors while requiring a smaller amount of collector surface area or, on the other hand, can collect more heat for the same area as prior-art collectors. The large surface area requirement of conventional collectors is costly, and thus effectively inhibits solar radiation from being a viable energy alternative except for a few limited applications and in geographical areas where sunlight is abundant.

In order to maintain cost competiveness the collector should be able to perform efficiently for many years. The collector must, therefore, be designed to accomodate the adverse effects of: the sun's ultraviolet radiation; corrosion or clogging due to acidity, alkalinity or mineral content of the heat transfer liquid; freezing; air-binding; and breakage of glazing due to thermal expansion, hail, or other causes.

Another problem plaguing conventional solar heat collectors is the excessive amount of heat that accumulates when the energy is not being extracted either for storage or for utilization. Since a collector is designed to retain as much heat as possible, an overheating problem is present when the heat transfer liquid is drained or not flowing. This accumulation of excessive heat can cause severe physical damage to the collector. Conventional collectors have either various mechanical devices, such as louvers, designed to reflect or otherwise shield solar radiation from the collector when it is non-operational or conventional collectors are constructed with more expensive heat resistant materials and construction features to withstand temperatures up to 400° F. Other mechanical devices have also been used to reflect or otherwise shield solar radiation from the collector. The limited durability of these mechanical devices is undesirable when compared with the longlife requirements of a solar heat collector. The costs of such devices and associated mechanical problems make this method of dealing with the over-heating problems of solar heat collectors undesirable in general, and in many cases prohibitively expensive.

The background of the art to which this invention relates is described in substantial detail in a publication entitled "Solar Energy Utilization For Heating and Cooling" compiled by John I. Yellott, Arizona State University and referenced as NSF 74-41. This document was prepared under National Science Foundation Grant, GI-39247 and is available from the United States Government Printing Office, as stock number 3800-0018.

As described in NSF 74-41, the prior art approaches to solar heat collectors have been numerous, with each possessing deficiencies affecting the overall operation and efficiency of a solar energy system. When the objective of the collector is to heat a liquid the conventional approach has been to attach metal tubes to the absorber, and cause a liquid to flow through the tubes. The tubes are sometimes attached above, below or integral with the absorber surface. The heat transfer liquid absorbs the heat from the absorber surface through the tube surface. The heat transfer liquid may be flowing or not flowing, depending on its operational status.

As a consequence of this design, two major problems must be solved to achieve satisfactory efficiency. In order to transfer the maximum quantity of heat to the heat transfer liquid the absorber and tube material must possess good thermal conductivity characteristics. Additionally, the bond between the tubes and absorber must maximize the transfer of heat with minimal thermal impedance. There are solutions to both problems but the solutions give rise to excessive costs for labor and materials.

Materials most frequently used for absorber plates, in decreasing order of cost and thermal conductivity, are copper, aluminum and steel. The effect of bond conductance has been studied with the conclusion that steel pipes are as good as cooper if the bond conductance between tube and plate is good. Bond conductance can range from a high of 100 Btu/(ft)/° F/hr. for a securely soldered tube to a low of 3.2 for a poorly clamped or badly soldered tube. Bonded plates with integral tubes are among the better alternatives for performance.

Illustrations of various prior art solar heat collectors that have been used to heat water with varying degrees of success are shown in NSF 74-41, FIG. 10 at page 59.12. In all of these prior art configurations, a heat transfer liquid is either flowing in tubes or along prescribed troughs. Designs such as these encourage heat to be lost upwards by convection, reflection or evaporation into the environment. In the tube design the entire absorber surface is exposed and thus radiates heat upward and outwards. Where the trough design is utilized those portions of the absorber exposed will radiate heat upwards and evaporation of the exposed liquid will transfer latent heat upward and outward.

GENERAL NATURE OF THE INVENTION

In the present invention, a solar heat collector comprises a first panel of solid material providing an absorber panel for converting solar radiation to heat and a second panel of solid light transmitting material spaced from and confronting the absorber. A heat transfer liquid is caused to flow between the absorber panel and light transmitter panel along a surface of the absorber panel in a prescribed path which covers substantially the entire absorbing surface of the first panel, and the liquid fills the space between the two panels. This path is established by an array of baffle means which are arranged between the absorber panel and transmitter panel. In a preferred embodiment of the invention, the baffles are a structural part of the absorber panel arranged to make contact with the confronting surface of the light transmitter panel.

In operational position, the collector in the preferred embodiment is tilted with one edge below another, and the heat transfer liquid is introduced into the collector from an inlet trough located along the entire lower edge of the collector. An outlet trough located along the entire upper edge of the collector allows warmed heat transfer liquid to be withdrawn from the device. The collector can be enclosed from the sun facing side with glass to minimize heat loss to the environment.

Also according to a preferred embodiment of the invention, there is provided a tortuous path through which the heat transfer liquid flows between the panels of the collector, and thus provides impedance to liquid flow so as to allow a plurality of collectors to be more readily utilized in parallel. The effect of providing this increased liquid impedance is to cause two or more collectors to be filled essentially equally and to operate at essentially the same rate of flow, without separate metering means, while connected across a pair of lower impedance inlet and outlet pipes.

In addition, the tortuous path of flow is arranged to minimize the trapped air in the collector, thus allowing uniform flow of heat-transfer liquid. This mode of flow provides a self cleaning system for the collector and thus maintains its effectiveness over a long period of time. Accordingly, in the preferred embodiment, the baffle arrangement is designed to be inclined from the horizontal, and not necessarily parallel to the incoming and outgoing water troughs. The inlet and outlet water troughs need not be horizontal nor parallel to each other. The amount of heat transfer liquid that may be trapped when the panel is emptied of the liquid, and in its reflecting mode, is purposely kept small. The fact that a small quantity rather than a significant quantity of heat transfer liquid is then present prevents damage to the collector due to freezing of the liquid.

The light transmitter panel has an index of refraction that is substantially matched to the index of refraction of the heat transfer liquid. When the heat transfer liquid is present, filling the space between the two panels, there is essentially no optical discontinuity and little or no reflection as light passes from the transmitter panel to the liquid, and the maximum amount of solar radiation reaches the absorber surface. When the heat transfer liquid is absent from within the collector, in its non-operational or light-reflecting mode, a significant amount of solar radiation is reflected back to the environment by the light transmitter panel.

In another embodiment of this invention the reflecting characteristics of the light transmitter panel is enhanced by having an array of totally internal reflecting prisms covering substantially the entire inner surface of the panel. This arrangement can under certain conditions reflect substantially all of the direct solar radiation and a large proportion of the scattered radiation that is incident upon the panel preventing the absorber from overheating when the heat-transfer liquid is not present at the inner surface of the second panel. When the heat transfer liquid is present, in the operational or heating mode, the prism array reflects essentially no solar radiation, and the second panel allows the light to proceed through the heat transfer liquid to the absorber panel.

This invention provides for the elimination of the mechanical devices, with their associated maintenance problems, heretofore used to shield a solar heat collector in its non-operational mode or allows the panels to be built with less expensive materials and less expensive heat resistant construction features. Merely by controlling the presence of the heat transfer liquid in the collector the operation of the device is effectively controlled.

DETAILED DESCRIPTION OF THE DRAWINGS

Figure 1:
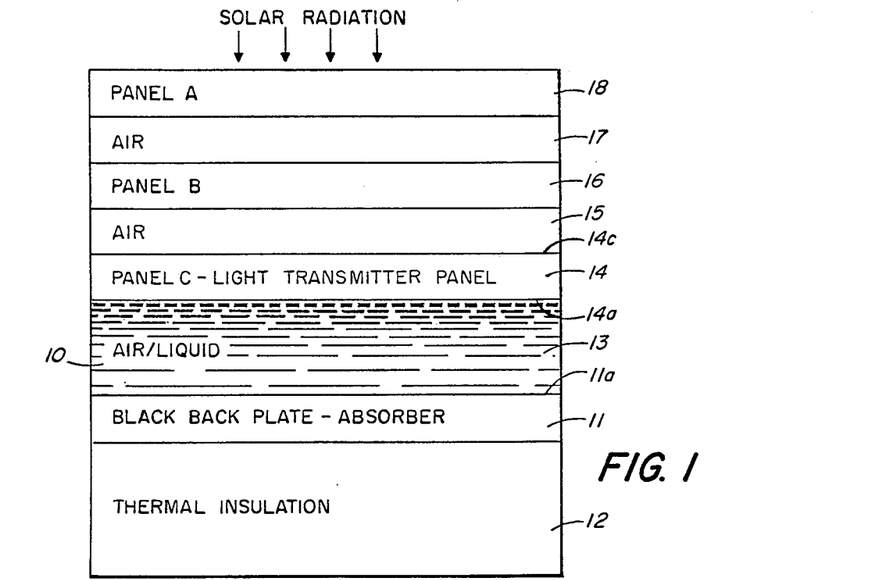
FIG. 1 is a schematic illustration of a cross sectional view of the invention according to one presently preferred embodiment thereof.

In FIGS. 1-8, inclusive, one embodiment of the solar heat collector is illustrated to demonstrate its operational and physical characteristics. These drawings show the entire collector and various section views depicting the structure necessary to cause the preferred mode and path of flow. In FIG. 1 a black back plate 11 called an absorber is mounted above the thermal insulation 12. The thermal insulation 12 is used to reduce the downward heat loss from the absorber 11. Where space heating directly from the collector is preferred the thermal insulation 12 would not be required.

Directly above the absorber 11 and below the parallel confronting light transmitter panel 14 is a passageway 13 through which the heat transfer liquid 10 is caused to flow when the collector is used in the heating mode. The heat transfer liquid completely fills the passageway 13 so as to substantially totally displace any gas from it. In the reflecting mode, the heat transfer liquid is not present but is instead replaced by a gas, typically by air.

Directly above passageway 13 is the light transmitter-panel 14 which is parallel to and confronting the absorber 11. This panel aids in reducing the upward loss of heat collected on the absorber. In addition, the design of panel 14, as will be discussed in detail below, allows solar radiation to pass through when a heat transfer liquid is present and reflects much or all of the solar radiation back into the environment when the heat transfer liquid is absent from passageway 13 and air or another gas is present.

The flow of the heat transfer liquid is preferably a laminar mode of flow along the adjacent surface 11a of the absorber 11. This mode of flow or other mode which is essentially non-turbulent is desirable in order to minimize heat loss upwards while maintaining excellent heat transfer to the immediately-adjacent liquid. By maximizing the amount of heat transfer liquid in contact with the absorber the heat transmitted to the heat transfer liquid is increased while the mass of liquid nearer to the light transmitter panel 14 acts as an insulator, so that the loss of heat upwards to and through the light transmitter panel 14 is reduced. The heat transfer liquid thus not only receives solar energy in the form of heat but also performs the function of an insulator between the absorber surface 11a and the light transmitting panel 14. This mode of substantially laminar heat transfer liquid flow therefore increases the operating efficiency of the solar collector panel.

Above the light transmitter panel 14 is an enclosed air space 15, a second light transmitting panel 16, another enclosed air space 17 and a third light transmitting panel 18. This configuration of parallel and confronting light transmitting panels separated by enclosed spaces of air is conventional. The purpose of this structural configuration is to enhance the solar collector's operational characteristics while protecting the solar collector from damage due to weather elements. The amount of heat lost upward into the envirnoment is reduced by having this essentially dead air structure above the light transmitter panel 14 and absorber surface 11.

Figure 2:
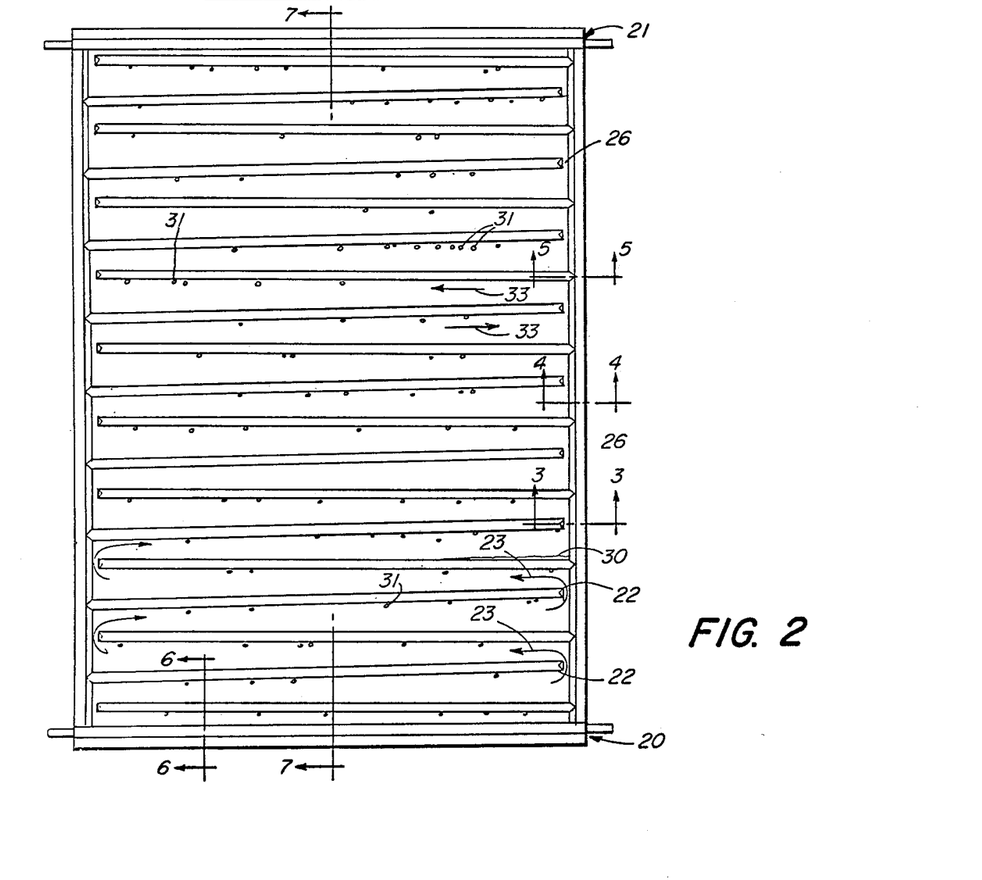
FIG. 2 is a top plan of a solar heat collector according to the invention.
Figure 6:
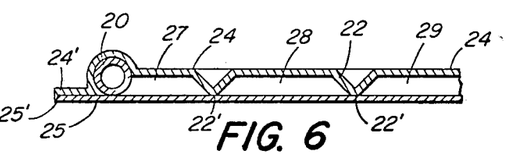
FIG. 6 is a section view on line 6—6 of FIG. 2.

FIG. 2 shows the structure of the solar heat collector with the absorber panel 24 facing the viewer. Baffles 22 are illustrated as being formed in the surface of the absorber panel 24. The apices 22' make contact with the light transmitting panel 25, as is best shown in FIG. 6. The heat transfer liquid is introduced into the solar heat collector through the inlet trough 20. The heated heat transfer liquid is withdrawn from the solar heat collector through outlet trough 21. The arrangement of baffles 22 provides a high flow impedance tortuous flow path for the heat transfer liquid. The directional flow of the heat transfer liquid is depicted by the arrows 23.

Figure 3:
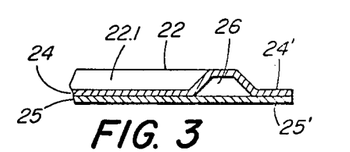
FIG. 3 is a section view on line 3—3 of FIG. 2.

In FIG. 3, is shown the opening 26 at one end of a baffle 22 through which the heat transfer liquid is required to change direction. The panels 24, 25 are fastened at their respective edges 24' and 25', as by a suitable cement.

Figure 4:
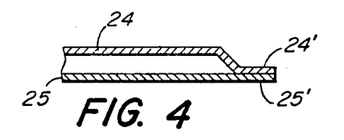
FIG. 4 is a section view on line 4—4 of FIG. 2.
Figure 7A:
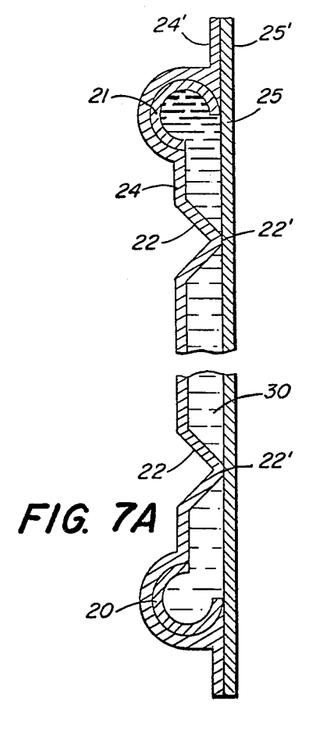
FIG. 7A is an enlarged section view on line 7—7 of FIG. 2 depicting a solar heat collector filled with a heat transfer liquid.

In FIG. 4 a cross section of the absorber 24 and light transmitting panel 25 is shown, in a region not including a baffle 22 confronting arrangement between the absorber panel 24 and light transmitter panel 25. The heat transfer liquid is caused to fill the space between these panels when flowing between them. (see FIG. 7)

Figure 5:
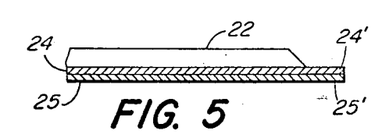
FIG. 5 is a section view on line 5—5 of FIG. 2.

In FIG. 5 a section of the absorber surface 24 and light transmitter surface 25 is shown taken longitudinally through a baffle 22 where it meets the edges 24' and 25'. The heat transfer liquid is caused to flow along a surface 22.1 of the baffle 22. FIG. 5 does not show a water passage 26 (as shown in FIG. 3) since this baffle extends to the edges 24' and 25' of the solar heat collector.

In FIG. 6 a portion of the absorber panel 24 and light transmitter panel 25 is shown with the inlet trough 20. As is indicated above, the baffles 22 are preferably configured in the form of a truncated V. The heat transfer liquid is caused to flow in a direction along passageway 27, in the opposite direction along passageway 28, and in passageway 29 in the same direction of flow as in passageway 27.

The two panels, absorber panel 24 and light transmitter panel 25, are fastened together at the perimeters 24' and 25', and at the apices 22' of the baffles, by suitable cement or other fastening means which is selected so as to be leak proof, chemically resistant, non volatile and able to withstand expansion and contraction. The fastening means may include, among other suitable methods, chemical means, clamp type means including rivets or screw-grommet means or mechanical designs that maintain their bonding or locking characteristics in tension, compression and shear. The fastening means used to fasten the light transmitter panel 25 and absorber 24 at the apices of the baffles 22 can be different from those means used to fasten the panels at the perimeters 24' and 25'.

Figure 7B:
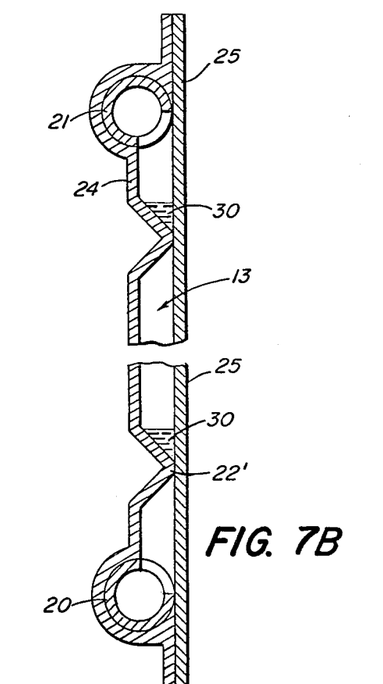
FIG. 7B is an enlarged section view on line 7—7 of FIG. 2 depicting a solar heat collector without heat transfer liquid.

FIGS. 7a and 7b show in broken section a complete solar heat collector with the inlet trough 20 and outlet trough 21, the light transmitter panel 25 and the baffled absorber panel 24. FIG. 7a depicts the solar heat collector in the operational mode with a heat transfer liquid 30 filling the passageway 13 between the panels from the inlet to the outlet trough. FIG. 7b shows the solar heat collector in the non-operational mode with the heat transfer liquid absent from the passageway 13. Shown in the latter is a small amount of heat transfer liquid 30, that remains present when the solar heat collector is emptied of liquid in the non-operational mode. The location of this remaining liquid is indicated in FIG. 2. In another embodiment of the invention drainage holes (not shown) are located at the bottom of each baffle allowing the remaining liquid to drain downward into the inlet trough 20.

As shown in FIGS. 2 and 7, heat transfer liquid 30 is trapped within the passageway 13 by the slight inclination from horizontal of each of the baffles 22. Although it is desirable to minimize the amount of heat transfer liquid trapped so that damage to the device causes by the freezing and thawing of the liquid is prevented, each baffle is inclined upward toward its free end at an opening 26 for an important reason. The inclination of each baffle 22 reduces the possibility of bubbles 31 of air or other gas being trapped in the passageway 13 under a baffle during filling with a heat transfer liquid, and during heat transfer liquid flow. As previously stated, the amount of trapped heat transfer liquid 30 remaining in the solar collector after draining the heat transfer liquid is an insignificantly small quantity that will not cause damage due to freezing.

Referring again to FIG. 2, where bubbles 31 of air or other gas are trapped along the lower surface of baffles 22, as the device is filled with heat transfer liquid, the inclination of each baffle 22 allows the trapped gas or air to be swept along each baffle, as is indicated by arrow 33, and than upwards, until the air or gas is vented through the outlet trough 21. The heat transfer liquid covers a greater portion of the absorber surface 11a (see FIG. 1), avoiding stoppage of the flow of heat transfer liquid, which might be caused by trapped air or other gas.

Figure 8:
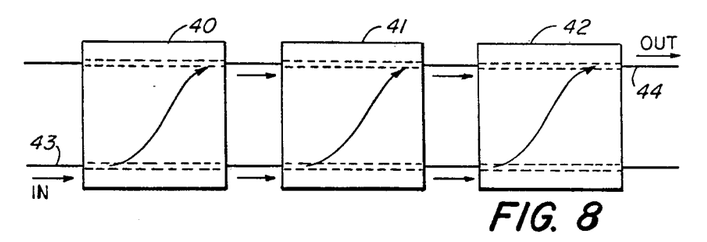
FIG. 8 is a schematic illustration of a plurality of solar heat collectors coupled together, and depicting the direction of flow of the heat transfer liquid.

In FIG. 8 several solar heat collectors 40, 41, 42 have been attached together in a parallel connection between an inlet conduit 43 and an outlet conduit 44. The inlet troughs of all the collectors are connected together in series in the inlet conduit, and the outlet troughs are connected together in series in the outlet conduit. The paths for flow of heat transfer liquid along the respective inlet and outlet troughs and conduits are low impedance paths of flow. The path for flow of heat transfer liquid from the inlet trough to the outlet trough within each solar heat collector is defined by the arrangement of baffles 22 (not shown) to be a comparatively high-impedance flow path. This results in uniform simultaneous filling of each collector when the collectors are connected in parallel across the conduits 43 and 44.

The operation of this solar collector panel is simplified and made more efficient compared with the prior art by the design of the light transmitter panel 14 of FIG. 1. In one embodiment of the invention the material of the light transmitter panel 14 is chosen such that the index of refraction of the panel is approximately equal to the index of refraction of the heat transfer liquid. Examples of such matches are Dupont's "Teflon" with an index of refraction of approximately 1.34 and water with an index of refraction of approximately 1.33; Dupont's "Tedlar" with an index of refraction of approximately 1.46 and SUN WORKS, INC. solar collector liquid with an index of refraction of approximately 1.46. Even with a match as approximate as that of glass (index of refraction — 1.5) and water (index of refraction —1.33) much of the advantage in efficiency over conventional configurations is retained. The heat transfer liquid has an index of refraction significantly different from that of air.

When the passageway 13 beneath panel 14 is filled with a liquid, which has substantially the same index of refraction as the material at the bottom surface 14a of the light-transmitter panel 14, there is no change of optical impedance across the interface of the bottom surface and the liquid touching it. Consequently, incoming solar radiation is transmitted from the light-transmitter panel 14 into the liquid with no significant amount of reflection, as though the panel and the liquid were substantially one and the same medium with respect to the solar radiation. If there is a slight difference in refractive index between the liquid and the material of the panel 14 at the surface 14a, there will be a correspondingly slight amount of light reflection, and most of the incoming solar radiation will still be transmitted into the liquid.

When the passageway 13 is empty of liquid the indices of refraction between the panel 14 and passageway 13 are significantly different. There is a corresponding change in optical impedance resulting in a significant amount of light being reflected off of panel 14.

In another embodiment of the light transmitter panel 14 the panel has an index of refraction approximately equal to the index of refraction of the heat transfer liquid and also has along the surface 14A of panel 14 a pattern or array of totally internal reflecting prisms covering essentially the entire surface 14a. In addition to the operation of panel 14 described above in the previous embodiment, the prisms have the affect of improving the operational characteristics of the collector.

Figure 9:
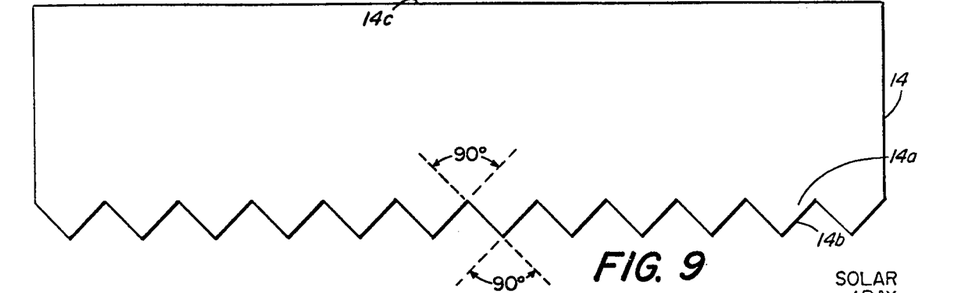
FIG. 9 is an enlarged cross sectional view of the light transmitter, panel.

In FIG. 9 is shown an enlarged cross sectional view of the light transmitter panel 14, depicting the pattern of totally internal reflecting prisms 14b on surface 14a. This pattern can also be described as a series of adjoining parallel sawtooth edges cut or molded in relief in the surface 14a. Each facet of each sawtooth makes an angle of approximately 90° with the adjacent facets on both sides of it. In a movable solar collector system in which the panel is moved, daily, to face the sun, the facets are at approxmately 45° with the top surface 14c of panel 14. In a fixed system in another embodiment of the invention, the facets can be at an angle other than 45° with the top surface 14c of panel 14 and properly oriented with respect to the position of the sun bearing in mind the variation in the sun's position at different times of the year. The sawteeth have relatively sharp apices and join each other in sharp or moderately sharp, recesses. The facet faces are specular surfaces. They are relatively smooth, shiny or polished surfaces, rather than rough or diffusing surfaces.

To explain the effect of the totally internal reflecting prisms when air or another gas has replaced the heat transfer liquid, the well-known optical phenomenon of total internal reflection must be understood. When a light ray passes at an angle other than perpendicular to the interfacing surfaces from a medium with an index of refraction $N_2$ into a medium with an index of refraction $N_1$ wherein $N_2$ is greater than $N_1$, the ray is refracted away from the normal to the interfacing surfaces. As the angle of incidence $I_2$ of the solar ray, i.e., the angle in the $N_2$ medium between the ray and the normal to the interfacing surface, increases, the angle of refraction $I_1$, i.e., the angle between the refracted ray and the normal to the interfacing surface, increases. The angle of refraction $I_1$, increases more rapidly than the angle of incidence $I_2$ due to Snell's law, which states that $N_1 \sin I_1 = N_2 \sin I_2$.

When the angle of refraction equals or exceeds 90°, no light is transmitted from the $N_2$ medium into the $N_1$ medium and the light is totally reflected back into the $N_2$ medium. When the angle of refraction equals 90°, the angle of incidence which corresponds to it is called the critical angle, Ic, Ic = arcsin $N_1/N_2$. At all angles of incidence in the $N_2$ medium equal to or greater than the critical angle, the light is totally reflected with no transmission in the forward direction into the $N_1$ medium.

For the case of Ic = 45°, sin Ic = $1/\sqrt{2}$, and $N_1/N_2$ = $1/\sqrt{}$. If the $N_1$ medium is air, then $N_1$ is unity, and in this case $N_2$ must be equal to or greater than $\sqrt{2}$ for total internal reflection.

Figures 10, 11, 12:
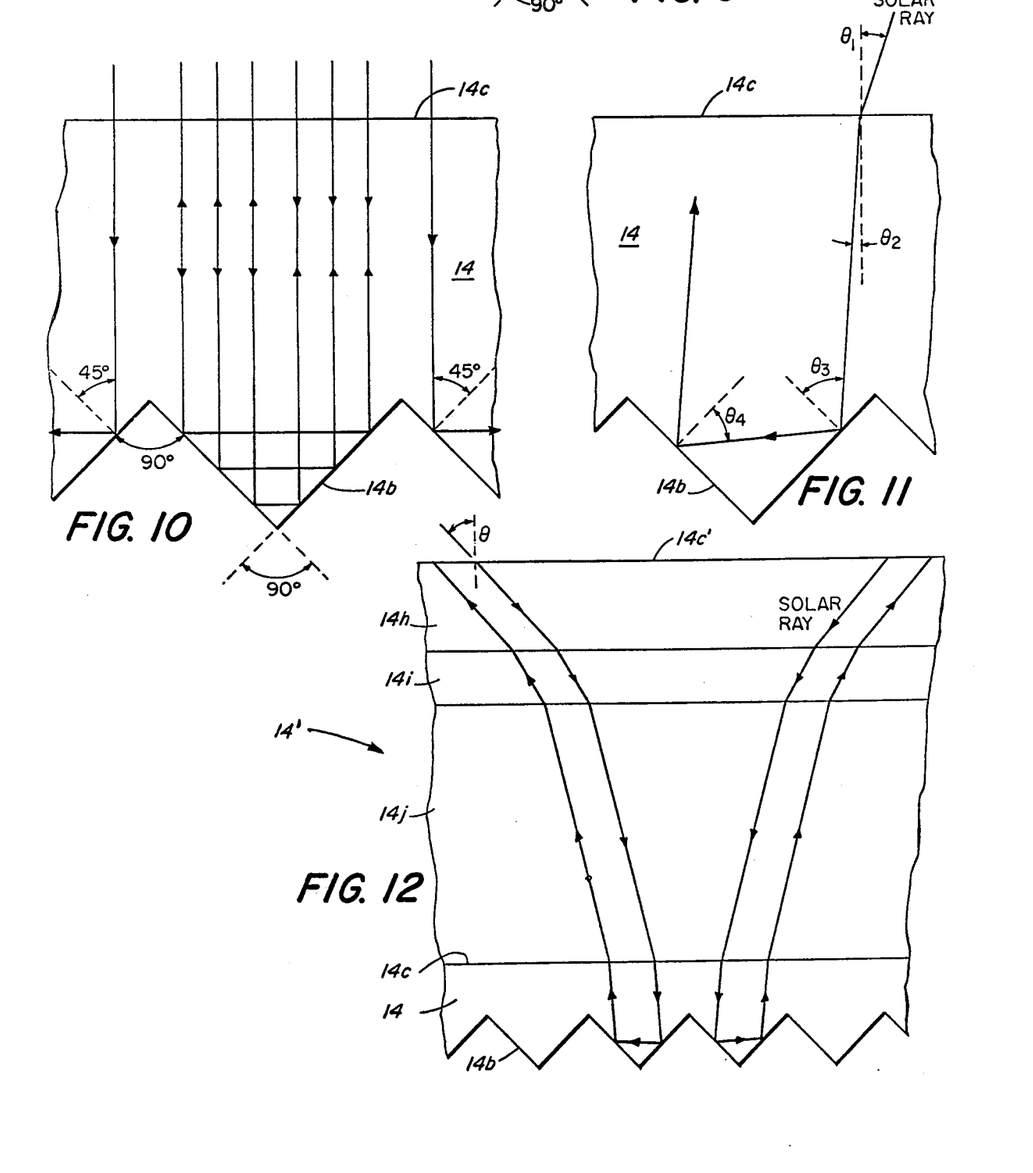
FIG. 10 is a further-enlarged partial cross sectional view of the light transmitter panel of FIG. 9 depicting the reflection of solar radiation that is incident normal to the panel.
FIG. 11 is a further enlarged partial cross sectional view of the light transmitter panel of FIG. 9 depicting the reflection of solar radiation striking the panel at an angle which is different from the normal.
FIG. 12 is an enlarged partial cross sectional view of the light transmitter panel according to FIG. 9 modified to employ three layers of respectively different refractive index, and showing the resultant refraction angles of a solar ray incident upon the panel at an angle that is different from the normal.

In FIG. 10 is depicted the path of solar radiation that impinges normally on the top surface 14c of the light transmitter panel 14. Each ray reaches a facet of a prism 14b at an angle of incidence of 45°, which, for the material of the panel, is greater than the critical angle when air or other gas is in contact with the lower surface of 14a. The ray is therefore totally reflected twice through an angle of 90° within the prism 14b, and hence the panel 14, with no transmission into the air or other gas present at the lower surface of 14a. As is apparent, the ray is reflected twice through an angle of 90°, for a total angle of 180° and the direction of the ray is completely reversed, and it is sent back in the direction whence it came, i.e., back to the sun. Thus, the sawteeth have acted as a set of internally reflecting prisms.

The dispersion of the material of panel 14 makes Ic vary with wavelength; but the dispersion is not enough to make Ic exceed 45°. Thus, while dispersion can occur in the panel 14, the sawtooth prisms in the present preferred material (fiber glass), produce total internal reflection for wavelengths of solar radiation that contribute substantially to the energy collected.

In some solar energy collection systems, it has been suggested that the solar collection panel be tilted mechanically to face directly into the sun continually throughout the year. In such a system, the solar rays incident upon the top surface 14c of panel 14 can be kept at normal incidence, or closely enough to normal incidence, so that light reflection in the sawtooth pattern of prisms is complete, as described above. However, the total-internal-reflection effect of the sawtooth pattern is not confined to solar rays that impinge normally upon the panel. FIG. 11 illustrates a solar ray that reaches the top surface 14c of the panel 14 at an incident angle $\theta_1$, in a plane that is perpendicular to the ridges of the prisms. The ray is refracted to an angle $\theta_2$ relative to the normal to the top surface 14c of the panel, where $\theta_2 < \theta_1$. The ray then reaches a facet of the prism 14b at an angle $\theta_3$ to the normal. $\theta_3$ = 45° + $\theta_2$. Therefore $\theta_3$ is greater than $I_c$, and the ray is totally reflected. It then meets the adjoining facet of the same prism at an angle $\theta_4$ to the normal. $\theta_4$ = 45° − $\theta_2$. When $\theta_2$ is small, $\theta_4 > I_c$, and the ray is totally reflected upwards toward the top surface 14c. As $\theta_2$ increases, $\theta_4$ will become smaller and will approach and eventually become smaller than Ic. However, even when $\theta_4$ is somewhat smaller than $I_c$, a substantial fraction of the intensity of the solar rays is reflected upward to the top surface of 14c, and only a small fraction is transmitted through the prisms into the air beneath. Thus, a comfortable tolerance is permissible in the accuracy with which the moving panel is pointed directly at the sun.

However, it is unnecessary to rotate the panel to follow the sun in order to attain substantially total reflection of the solar rays at all hours of the day, when air replaces liquid beneath the light transmitter panel 14. To accomplish this the sawtooth pattern is preferably oriented with the ridges of the sawteeth lying approximately parallel to the ecliptic plane of the sun's travel as seen from the panel, and the panel is fixed in a position to substantially face the sun at noon. At noon, the sun's rays strike the panel at normal incidence, and the situation is as shown in FIG. 10. At other hours of the day, the sun's rays strike the panel more obliquely; i.e.: the incident angle $\theta_1$, increases. The sun's ecliptic plane is at right angles to the plane of the drawings of FIGS. 10 and 11, and not in the planes of these drawings. To visualize this in FIG. 10, for example, consider each of the sun's rays to appear to rotate in a plane perpendicular to the plane of the drawing. When each ray first reaches a sawtooth facet, the angle that the ray makes with the normal to the facet is always larger than it is at noon, i.e., larger than 45°. The angle of incidence at the first sawtooth facet is thus always much greater than the critical angle Ic; and total internal reflection (with no transmission) takes place at the first facet reached by each ray. The ray then impinges on the adjacent facet at an incident angle that is again greater than 45° and therefore much greater than Ic. By total internal reflection, the ray is reflected out of the panel through the top surface 14c, into the atmosphere above the panel, with essentially no transmission into the air beneath the panel, at all hours of the day.

In order to have total internal reflection the critical angle, $I_c$, must not be greater than approximately 45°. Where, for example, Tedlar with an index of refraction of approximately 1.46 is the material of the light transmitter panel 14, the critical angle is approximately 43° 14'. Since total internal reflection will occur at angles equal to or greater than the critical angle, there is at 1° 46' tolerance at the prism facet for which total internal reflection will occur. Because light is refracted upon entering the panel 14, the 1° 46' tolerance becomes a 2° 35' tolerance in each direction at the top surface of light transmitter panel 14, as illustrated in FIG. 11, or a total tolerance of 5° 10'.

This is the tolerance with which the panel must face the sun at noon in order to obtain total internal reflection. A solar ephemeris prepared from data supplied by the United States Naval Observatory, Washington, D.C., shows that the declination of the sun changes by only 5° 10' during a period of approximately 2½ months centered around the summer solstice, i.e., June 21, which is the date of maximum solar declination. Consequently, in the northern hemisphere for example, a panel whose prisms have a material with an index of refraction of 1.46 can be mounted in a fixed position so that the normal to the panel is at an elevation angle that is 2° 35' below the elevation of the sun at noon on June 21st. at the latitude that the panel is located; whereupon there will be substantially total internal reflection at noon and during the entire day during every day of the aforesaid approximately 2½ month period. This is the period during which maximum solar radiation should occur each year.

For those days when total internal reflection does not occur at noon, in the period before and after the aforesaid period of 2½ months, total internal reflection will occur shortly before and after the noon hour and for all other times during the entire day. Thus, the internally reflecting prisms are effective during the significantly hottest part of the year.

In practical consequence there is substantially greater tolerance than the mathematical calculations necessarily depict, in prism angle, in indexes of refraction of the transfer liquid and prism material, and in selecting a mounting angle to obtain total internal reflection. If, for example, there is a tolerance of about 5° in the mounting angle to achieve total reflection of the noon day sun during the high and hot sun of June and July, then this tolerance quickly increases as the sun moves further away from its noon position. As little as one half hour before or after noon, the sun's radiation reaches the collector from an angle of more than 7° from the east or west. By 2 o'clock or before 10 o'clock the sun comes from an angle greatly removed from perpendicular to the face of the panel with the result that reflection is achieved throughout much of the day with materials having lower indexes of refraction or with inaccurate prism structures.

The above described orientation of the sawteeth has the additional advantage that the sawteeth do not impede the flow of the liquid, and do not produce turbulence, when the collector panel is designed so that the direction of the liquid flow is horizontal, because the liquid then flows along the sawtooth grooves, and not across the grooves.

In FIG. 12 the light transmitter panel 14' is made of three layers of three different light-transmission media 14H, 14I and 14J above the top surface 14c of panel 14. The index of refraction of medium 14H is less than the index of refraction of medium 14I. In addition, the index of refraction of medium 14I is less than the index of refraction of medium 14J and the index of refraction of medium 14J is less dense than that of the panel 14. Since the media are respectively more dense as the solar ray enters the next successive medium, the angle of refraction from the normal is smaller at each successive interface. The result is that the angle of incidence θ at the top surface 14C' of the entire panel 14' for which internal reflection can be produced at the sawteeth 14b is much greater than the angle of incidence at the interface between media 14J and 14.

Within reasonable manufacturing sizes and tolerances the size of the sawteeth in the pattern is not critical, and can be selected within limits to suit the convenience and economics of manufacturing, the dimensions of the water space and water channels beneath panel 14, the thicknesses and strengths of panel 14 and its coatings if any. The width of each facet of the sawtooth should be large compared to the long wavelengths of solar radiation, and thus the facet should be at least approximately 100 microns wide, in order to avoid diffraction effects. For manufacturing convenience larger widths are generally desired.

I claim:

1. In a solar heating panel having an absorber panel for converting radiant energy into heat, a sheet of solid material substantially transparent to visible light for transferring such energy to said absorber panel, said absorber panel and said sheet of solid material defining a space for a heat transfer liquid, the improvement comprising:
   internally-reflecting prism means on the surface of said sheet of solid material facing towards said space for heat transfer liquid, for substantially entirely reflecting visible light that is incident upon said panel when said heat transfer liquid is not present.

2. A solar panel according to claim 1 wherein sunlight at the solar noon at summer solstice reaches the prism facet at an angle above the bisector of the vertex by approximately the difference between 45° and the critical angle for total internal reflection.

3. A solar heating panel according to claim 1 wherein the solid material has an index of refraction of approximately 1.46 and the bisector of the prism vertex is directed approximately 2½° below the altitude of the noon sun at summer solstice.

4. A solar heating panel according to claim 1 wherein the internally reflecting prism means consist of 90° sawteeth.

5. A solar panel according to claim 4 wherein sunlight at the solar noon at summer solstice reaches the prism facet at an angle above the bisector of the vertex by approximately the difference between 45° and the critical angle for total internal reflection.

6. A solar heating panel according to claim 4 wherein the sawteeth are oriented substantially in the plane of the ecliptic.

7. A solar panel according to claim 6 wherein sunlight at the solar noon at summer solstice reaches the prism facet at an angle above the bisector of the vertix by approximately the difference between 45° and the critical angle for total internal reflection.

8. A solar heating panel according to claim 4 wherein the facets of the 90° sawteeth make an angle of 45° with the top surface of said second sheet.

9. A solar panel according to claim 8 wherein sunlight at the solar noon at summer solstice reaches the prism facet at an angle above the bisector of the vertex by approximately the difference between 45° and the critical angle for total internal reflection.

10. A solar heating panel according to claim 6 wherein the sawteeth are oriented substantially in the plane of the ecliptic.

11. A solar panel according to claim 10 wherein the sunlight at the solar noon at summer solstice reaches the prism facet at an angle above the bisector of the vertex by approximately the difference between 45° and the critical angle for total internal reflection.

12. An optical plate for selectively transmitting and blocking radiation comprising:
   a light control panel having a front surface to admit electromagnetic radiation;
   a light controlling rear surface to control transmission into a medium and to control reflection of light and having a multiplicity of prisms formed on said surface;
   said prisms having at least two sides formed at an angle up to 45° with respect to the direction of light and at an angle of about 90° with respect to each other;
   said prisms comprising a material transparent to the radiation being transmitted and an index of refraction with respect to the medium equal to or greater than $\sqrt{2}$ whereby light reaching the prism surface at an angle greater than the angle whose sine equals the quotient of the index of refraction of the medium divided by the index of refraction of the material of the rear surface of the plate is directed at an angle greater than the critical angle for total internal reflection and is totally reflected;
   whereby light entering said panel from said front surface can be totally reflected and light entering siad panel from said rear surface can be transmitted.

13. An optical panel for selectively transmitting and reflecting light and similar radiation comprising:
   a first panel having a front face to receive radiation and a rear face to transmit radiation;

an array of prisms on said rear face arranged to present an internal angle of approximately 90° to radiation entering from said front face;
means to provide a transparent liquid to said array of prisms, said liquid having an index of refraction substantially different from the index of refraction of air and matched to the index of refraction of said prisms;
means to remove said liquid from said array of prisms, whereby the surface of said prisms present an interface causing total internal reflection in the absence of said liquid and providing substantially complete transmission of radiation in the presence of said liquid in contact with said prism surfaces.

* * * * *